C. COUSE.
Rope-Machine Indicator.
No. 62,398.
Patented Feb. 26, 1867.
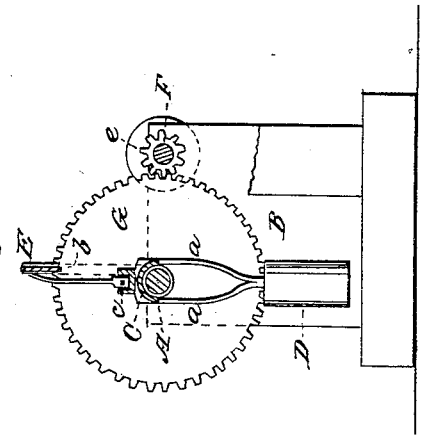
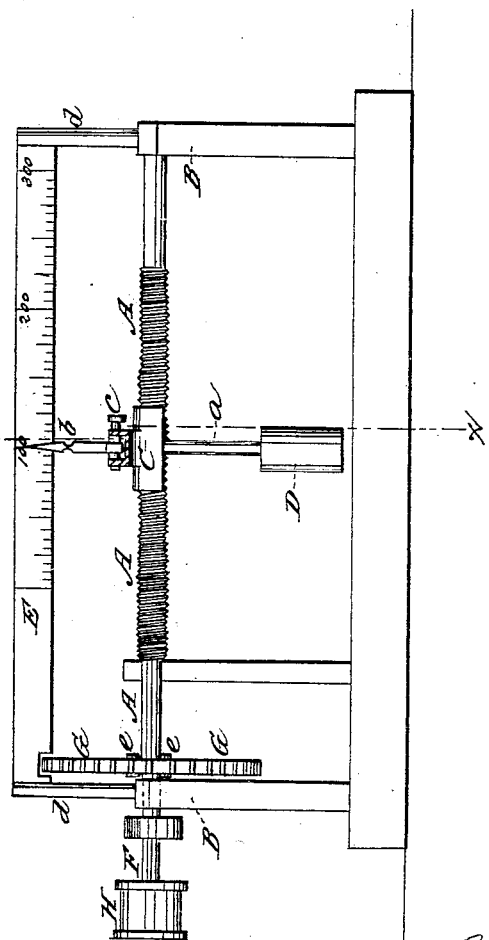

United States Patent Office.

CHARLES COUSE, OF BELLEVILLE, NEW JERSEY.

Letters Patent No. 62,398, dated February 26, 1867.

---

IMPROVEMENT IN INDICATORS FOR ROPE AND OTHER MACHINES.

---

The Schedule referred to in these Letters Patent and making part of the same.

---

TO ALL WHOM IT MAY CONCERN:

Be it known that I, CHARLES COUSE, of Belleville, in the county of Essex, and State of New Jersey, have invented a new and improved Indicator; and I do hereby declare that the following is a full, clear, and exact description thereof, which will enable others skilled in the art to make and use the same, reference being had to the accompanying drawings, forming part of this specification.

This invention relates to an indicator which is more particularly to be applied to rope and thread machines, but which may also be employed on other machines. Its object is to show the number of revolutions made by any one shaft. The invention consists in the manner of operating an index hand or pointer in such a manner that it will move along a graduated scale and show thereon the number of revolutions made by the machine to which it is annexed. The invention also consists in the manner of arranging the aforesaid index hand, so that it may with ease be set to any point on the graduated scale. In the annexed drawing my invention is illustrated—

Figure 1 representing a side elevation of my improved indicator, partly in section; and Figure 2, a vertical cross-section of the same, the plane of section being indicated by the line $x\ x$, fig. 1.

Similar letters of reference indicate like parts.

A represents a horizontal shaft, which is hung on suitable bearings in the uprights B B. A screw-thread is cut on the shaft A, as seen in fig. 1. A half-nut, C, is held upon and moved by the screw A, a weight, D, which is attached to it by means of bars $a$, holding the nut down. To the nut C is attached an index hand or pointer, $b$, which may be adjusted in the direction of the shaft A by a set-screw, $c$. The hand $b$ moves along a plate, E, upon which a graduated scale is arranged, as shown in fig. 1. The plate E is mounted on bars, $d$, which are fixed to the uprights B B. Motion is imparted to the screw-shaft A by means of a pinion, $e$, which is mounted on the shaft F, which pinion meshes into the cog-wheel G on the shaft A. The cog-wheel G is, in the drawings, so arranged that it will make one revolution to five of the pinion $e$, and thus, as the screw-thread and the scale are graduated accordingly, the hand $b$ will move one division, indicated by the short lines on the scale, to each revolution of the shaft A, or one-fifth of such division on the scale to one revolution of the shaft F, thus showing at the scale the exact number of revolutions of that shaft. As the nut C can be raised from the shaft A, it can be set to any desired part, so that the hand $b$ will, before the machine starts, point toward any desired figure on the scale. If the hand should not be exactly over such a desired figure, it may be set accordingly by means of the set-screw $c$. The screw-shaft and the scale may be made of any desired length, so that a larger number of revolutions of the shaft F may be indicated. But if the scale should not have enough divisions to indicate all the revolutions which the shaft F may make in a certain space of time, then the pointer can with ease, when it has arrived at the end of the scale, be replaced so as to begin to indicate again from the beginning of the scale. The thread or rope (if this indicator is applied to that purpose) is wound upon a spool or drum, H, on the shaft F. Motion is imparted to the shaft F by a pulley or cog-wheel, I, or by any other analogous device.

What I claim as new, and desire to secure by Letters Patent, is—

1. The combination of the screw-shaft A with the half-nut C, weight D, and pointer $b$, and scale E, substantially as and for the purpose herein shown and described.

2. I claim the combination of the half-nut C with the hand $b$, set-screw $c$, and scale E, substantially as and for the purpose herein shown and described.

CHAS. COUSE.

Witnesses:
 WM. F. MCNAMARA,
 ALEX. F. ROBERTS.